July 31, 1945.   H. V. SMITH ET AL   2,380,800
WATER TREATMENT
Filed May 20, 1939

INVENTOR.
HOWARD V. SMITH,
MARGARET C. SMITH,
BY Herbert L. Sheppard
ATTORNEY.

Patented July 31, 1945

2,380,800

UNITED STATES PATENT OFFICE 2,380,800

WATER TREATMENT

Howard V. Smith and Margaret C. Smith, Tucson, Ariz.

Application May 20, 1939, Serial No. 274,683

12 Claims. (Cl. 210—23)

This invention relates to the treatment of water and, more particularly, to the purification of potable waters for the removal or correction of certain undesirable or harmful characteristics of such waters, or of other liquids designed for human consumption.

Specifically, the invention contemplates a treatment for potable waters or other liquids which are contaminated, either through natural occurrence or through incidental inclusion, with fluorine, fluorides or other fluorine compounds in such amounts that habitual consumption of the liquids is harmful or dangerous for the human system, and particularly for the teeth. The primary aim of the invention is to remove the fluorine or fluorides from such liquids or at least to reduce the fluorine content to an amount below that which has been determined to exert toxic effects upon the human system.

Since about 1931, when the cause of mottled enamel, an irreparable defect of human teeth, was found by the applicants herein to be due to excessive amounts of fluorine in drinking water, there has been sought a method of its removal from water supplies which would be effective and efficient but at the same time economically attractive. The problem has been a difficult one, because of the small amounts of fluorine present in drinking water. The continuous use of water containing as little as .9 part per million of fluorine has been found to cause mottled enamel.

Certain methods of fluorine removal have been proposed heretofore but have either proved ineffective for the lowering of the fluorine concentration in water sufficiently to prevent mottling of teeth, or have proved impractical in their actual operations, generally from an economic standpoint. The use of aluminum sulfate for fluorine removal has been suggested, but this method is at the most quite costly and sometimes unreliable. Another proposal has been the use of activated carbon but disadvantages inherent in that method are the high cost of activated carbon and the fact that satisfactory absorption of fluorine would not take place above a pH of 3. Other proposals have used activated alumina and the lime-soda method familiar in water softening. All of these previous methods have proved generally unsatisfactory in one way or another, at least from a practical standpoint.

It is an object of the present invention to provide a method for the removal of fluorine from fluorine containing waters or other potable liquids, or for the lowering of the fluorine concentration therein to a point below that which is toxic to the human system, which method is simple, highly effective and economically attractive.

Another object is to provide a specially prepared material which will remove or reduce the fluorine in water, possibly by an exchange reaction.

Another object is to provide a manner of treating such material for the purpose of rendering it most efficient in fluorine removal action.

A further object is to provide a simple and effective method of regenerating the material in order that it may be used repeatedly in fluorine removal treatment.

A still further object is to provide a relatively simple apparatus, in the form of a water cooling and dispensing device which may be readily used in homes, offices, schools and the like, which will effectively lower the fluorine content in the water below that point which is acknowledged to be toxic.

The method of the present invention depends upon the affinity of bone, or other natural or artificially prepared apatite for fluorine. Chemical analysis and microscopic and X-ray refraction examinations indicate that bone is a carbonate apatite with the probable formula of

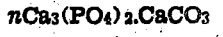

$nCa_3(PO_4)_2.CaCO_3$ in which $n$ equals 2 or 3. It has been found that treatment of fluorine-bearing water with finely ground bone results in the reduction of the fluorine concentration so as to render the water potable and harmless to cause the serious enamel mottling. Since the fluorine is present in natural waters in the form of fluorides, probably mainly of calcium and sodium, it is logical to believe that fluorine may replace the carbonate radical in the above exemplified carbonate apatite with the formation of an insoluble fluorapatite, leaving the harmless calcium and sodium carbonate in the water in place of the dangerous fluorides. By the same token other apatite compounds would have a similar affinity for the fluorine in fluorine-bearing water, possibly by the replacement of a harmless radical by fluorine to form the insoluble fluorapatite. Examples of such substances are the natural phosphate rocks which generally occur in the form of fluorapatite having the general formula $3Ca_3(PO_4)_2.CaF_2$, as well as artificially prepared apatites, such as hydroxy-apatite, or other similar calcium phosphate compounds. All of these compounds seem to have a marked affinity for the fluorine in fluorine-bearing waters and possibly act in an exchange reaction whereby the fluorine is exchanged for a relatively harmless radical or element in the treatment material with the formation of insoluble fluorapatite. Treatment material which commonly contain fluorine, such as the natural rock phosphate, and even the preferred bone, will generally require an initial processing to remove the fluorine present so as to render them most effective in the subsequent removal of fluorine from the water. Such processing forms an important part of the present invention and will be dealt with in detail presently.

As previously indicated, the preferred form of this invention makes use of the affinity of bone for the removal of fluorine from water and, consequently, the following description uses this form as a specific exemplification of the invention. It is to be understood, however, that other similar calcium phosphate compounds may be utilized instead of the preferred bone and the invention is to be limited only in accordance with the scope of the appended claims.

In the simplest form of the invention, bone, which has first been freed from fat and most of the protein material by boiling in water, is ground to a fineness of preferably 40 to 60 mesh. Such untreated bone may be used for the treatment of fluorine-bearing water and is effective in reducing the fluorine content of the water. The ground bone may be added to the desired quantity of water and agitated therewith for a suitable period of time, after which the bone with its combined fluorine may be removed from the water by sedimentation, filtration, or a combination of the two. If desired, the water may be passed through a filter bed consisting of the ground bone.

However, the effectiveness of the bone may be greatly enhanced by a pre-treatment operation, constituting an important part of the present invention, and its absorbing power can also be renewed after exhaustion by a simple treatment, similar to the initial processing. In describing this treatment, results of actual laboratory and field tests will be utilized in order to illustrate the invention in the most complete manner.

It has been repeatedly shown that animal bones contain fluorine, and that the amount varies with the intake of fluorine. Fossil bones, especially, have long been noted as high in fluorine content, the fluorine content increasing with the age of the bone, probably due to a prolonged contact with water or soil containing calcium fluoride. So the pre-treatment of this invention to remove the fluorine content will render the bone most active for subsequent removal of fluorine from water. Likewise, the same treatment may be applied to natural or other calcium phosphates containing fluorine, to render the same more effective for the subsequent absorption of fluorine from water.

In the pre-treatment method of this invention, bone is obtained freed from fat and most of the protein material by boiling in water. It is then crushed and boiled in a dilute solution (approximately 2N) of sodium hydroxide until it has lost its flinty characteristics and become snow-white and chalky in appearance. The excess hydroxide is then washed out, with frequent changes of water, and the last traces neutralized with an acid, preferably dilute hydrochloric acid or acetic acid. Subsequently the material is washed, dried and graded in fineness.

Tap water, with sodium fluoride added to raise the fluorine concentration to 5 P. P. M., was shaken with bone prepared as just described in an end-over-end shaking machine. 500 cc. samples were shaken for two hours with variable amounts of bone of 20 to 40 mesh. Fluorine analysis was subsequently made upon aliquot parts of the filtrate by two different methods which gave results in close agreement. Representative findings of these tests are presented in the following table:

*Table*

| Amount of bone used, grams | Original concentration of fluorine in water used, P. P. M. | | | | | |
|---|---|---|---|---|---|---|
| | 1.0 | 2.0 | 5.0 | 6.0 | 8.0 | 10.0 |
| | Fluorine concentration after two hours treatment, P. P. M. | | | | | |
| 0.5 | 0.6 | 0.8 | 2.0 | 3.6 | 4.8 | 6.4 |
| 1.0 | 0.1 | 0.5 | 1.25 | 1.4 | 2.8 | 4.8 |
| 2.0 | 0.1 | 0.1 | 0.8 | 0.8 | 1.6 | 3.6 |
| 6.0 | | | 0.0 | | | |

From the above table it will be seen that the bone treatment was effective in reducing the concentration of fluorine, the extent of its removal varying with the amount of bone used and the original fluoride concentration of the water. In these experiments, two grams of bone were sufficient to reduce the fluorine in 500 cc. of water from 6 P. P. M., which is a high concentration for drinking water supply and will produce the severest type of mottled enamel, to a concentration which is below the toxic level for humans, which is .9 P. P. M. When the initial fluorine concentration of the water ranged from 1 to 2 P. P. M., a concentration more commonly found in waters in communities in which mottled enamel is endemic, ½ gram of bone was effective in satisfactory removal of fluorine from the same amount of water.

Another group of tests demonstrated the relation of fineness of grinding of the bone to its effectiveness in fluorine removal under the same conditions. In these tests, bone prepared as previously described, but varying in fineness from 10 to 100 mesh, was used in the treatment of water with an original fluorine content of 5 P. P. M. under conditions substantially the same as those just described. Under the experimental conditions, bone of 10 to 40 mesh was not as effective as that which had been given a finer grind. On the other hand bone of 40 to 60 mesh reduced the fluorine concentration from 5 to .4 P. P. M. The more finely ground material was somewhat more effective in the amount of fluorine removed. It is evident, therefore, that the effectiveness of the bone is dependent to a certain extent upon its fineness of grind. The greater the surface of contact the more complete is the removal of fluorine under the conditions described. From the standpoint of use in filters, however, bone finer than 40 to 60 mesh is not recommended because of slowness of penetration.

The time of contact between bone and the fluorine-bearing water is also a factor affecting the extent of removal. When water containing fluorine was allowed to stand in contact with the specially prepared bone for a relatively long period of time before it was filtered off, the removal of fluorine by a given amount of bone was more complete than that resulting from shaking the bone with the water for a two hour period. For example, standing for ninety-six hours in contact with one gram of prepared bone reduced the concentration of fluorine from 2 P. P. M. to 0, as compared with a concentration of .5 P. P. M. remaining in a sample of water shaken for a two hour period. It is noted, however, that the contact of two hours was amply sufficient for reducing the fluorine concentration to below the toxic level.

Further tests were made to demonstrate the practicability of renewing or regenerating bone which had been used to remove fluorine from water so as to renew its absorptive capacity for fluorine and thus render the material capable of indefinite re-use. It was demonstrated that the absorbed fluorine could be practically completely removed from the used bone by treating the bone with a dilute solution of sodium hydroxide, either with or without boiling, and then washing out the excess hydroxide with water and neutralizing the last traces with an acid, such as hydrochloric, as in the initial processing. In this regeneration treatment, boiling in the caustic solution is not necessary if the time of contact is sufficiently long. Best activation of the bone is obtained by letting the bone stand over night in 0.2 to 0.5 normal sodium hydroxide. Agitation of the suspension would speed up the process and can be used if desired. The hydroxide is then washed out and the last traces neutralized with 0.1 normal acid for ten to fifteen minutes. Bone which had been twice renewed in this fashion was found to be equally as effective as the original material.

The chemistry of the removal of fluorine and fluorides from water by bone and other calcium phosphates has not been definitely proven, but it is believed to be in the nature of an exchange reaction. The unprepared bone is probably a carbonate fluorapatite and, while it has a certain affinity for the fluorine in water, the presence of small amounts of fluorine in the bone will naturally detract from its absorptive capacity. Since fluorine combines readily with sodium, the pretreatment in a weak sodium hydroxide solution will remove the fluorine in the form of the soluble sodium fluoride, which is washed out with water, and leave a substantially pure carbonate apatite. When this material is contacted with fluorine-bearing water, either by agitation with the water or by filtering the water through a bed of the material, it is believed that the fluorine displaces the $CO_3$ radical to form the insoluble fluorapatite having the general formula $(CaF)Ca_4(PO_4)_3$, the $CO_3$ forming the relatively harmless carbonates of the alkaline earth metals with which the fluorine was associated in the water.

In regenerating the bone, the exhausted material, which has become essentially the fluorapatite, is treated as in the first instance with a dilute caustic solution followed by washing and neutralization which removes the fluorine in the form of the soluble sodium fluoride, and the regenerated material probably becomes an hydroxy-apatite and, as such, is again ready for the removal of fluorine from water. In subsequent uses of the bone, after assuming the hydroxy form, the exchange reaction is probably effected by replacement of the hydroxy radical with fluorine. These are merely our theories, however, as to the various reactions occurring in the steps of the present invention and are offered as explanations and are not meant to be limiting in any way. Whatever the actual chemistry involved, we have discovered that the chemical compounds mentioned herein have a marked affinity for the fluorine in fluorine-bearing waters, that that affinity can be enhanced by the pre-treatment described, and that the treatment materials can be regenerated and renewed indefinitely in the manner described.

Similarly, natural rock phosphate, which is generally a fluorapatite, may be treated initially by caustic soda and acid neutralization to remove the fluorine and thus form an hydroxy-apatite for the treatment of fluorine contaminated water, and this material may be regenerated from time to time by the alkali-acid treatment. Likewise, chemically pure hydroxy-apatites and other calcium phosphates may be used in the removal of fluorine from water and may be subsequently regenerated by the alkali-acid treatment.

In the use of bone, specially pre-treated as previously described, a further processing step will materially improve the affinity of the bone for fluorine. It has been found that calcining the prepared bone improves its water wetability and prevents troublesome putrefaction of the bone. It has been found that putrefaction may set in after about a month or six weeks use in treatment of water. This seems to be due to organisms of putrefaction in the water. By calcining the bone for about ten minutes at a temperature of approximately 600° C. the tendency to putrify is entirely overcome. The protein content of the bone is not materially reduced by this treatment but is apparently changed to a form not susceptible to the organisms causing putrefaction. One calcination is sufficient and need not be resorted to in subsequent regeneration treatments.

While the preferred media for the initial processing and the regeneration of the bone are dilute sodium hydroxide and a suitable acid, it is obviously within the scope of the invention to employ other materials of a similar nature for effecting the desired reaction, which is the removal of fluorine from the material. For instance, the bone might be treated in the first instance and in the regeneration treatments with a solution of sodium chloride or of calcium chloride. In such treatment the acid neutralization might not be necessary but could be employed to assure a neutral product. Furthermore, in the treatment where sodium hydroxide is utilized for initial preparation or regeneration, it will be obvious that any other suitable acidic substance may be used to remove the last traces of hydroxide. While hydrochloric acid has been mentioned specifically, the same effect may be obtained by other acids, such as phosphoric or acetic acid. In fact, the latter has been used with marked success and has the advantage of being cheap and is not dangerous to use. Furthermore, the slurry or suspension could be neutralized by gassing with $CO_2$. In other words, the caustic soda treatment is the most efficient for initial or subsequent removal of fluorine from the treatment material but should be washed out thoroughly and the last traces neutralized with any suitable acidic substance. Thus, since the function of the acid treatment is to neutralize any traces of alkali it is obvious that any acid will affect the neutralization reaction. Manifestly, however, the use of acids which would substantially impair the fluorine removing ability of the treatment material or that would leave dangerous or toxic reaction products is not recommended.

As a result of the treatment of water by the material and process of this invention, no detectable change in the taste of the water is noted. Provided the acid and alkali used in the preparation of the material is completely removed, the pH of the treated water is not substantially different from the original. There may be some slight solution of the bone, which would be evidenced by a very slight increase in the phosphate ion concentration in the treated water. This increase might be considered desirable and is in no way detrimental.

Having described the treatment materials of the present invention which have been found effective in the removal of fluorine from drinking water supplies, and methods of treating such materials for beneficiation and regeneration thereof, together with indicating in a general way manners in which these materials may be used in the treatment of drinking water supplies, we will now describe and illustrate a specific application of the invention as embodied in a particular apparatus, comprising a part of the invention, which is highly efficient in the treatment of drinking water supplies. For this purpose the accompanying drawing will illustrate this convenient application of the method and in this drawing—

Figures 1, 2:
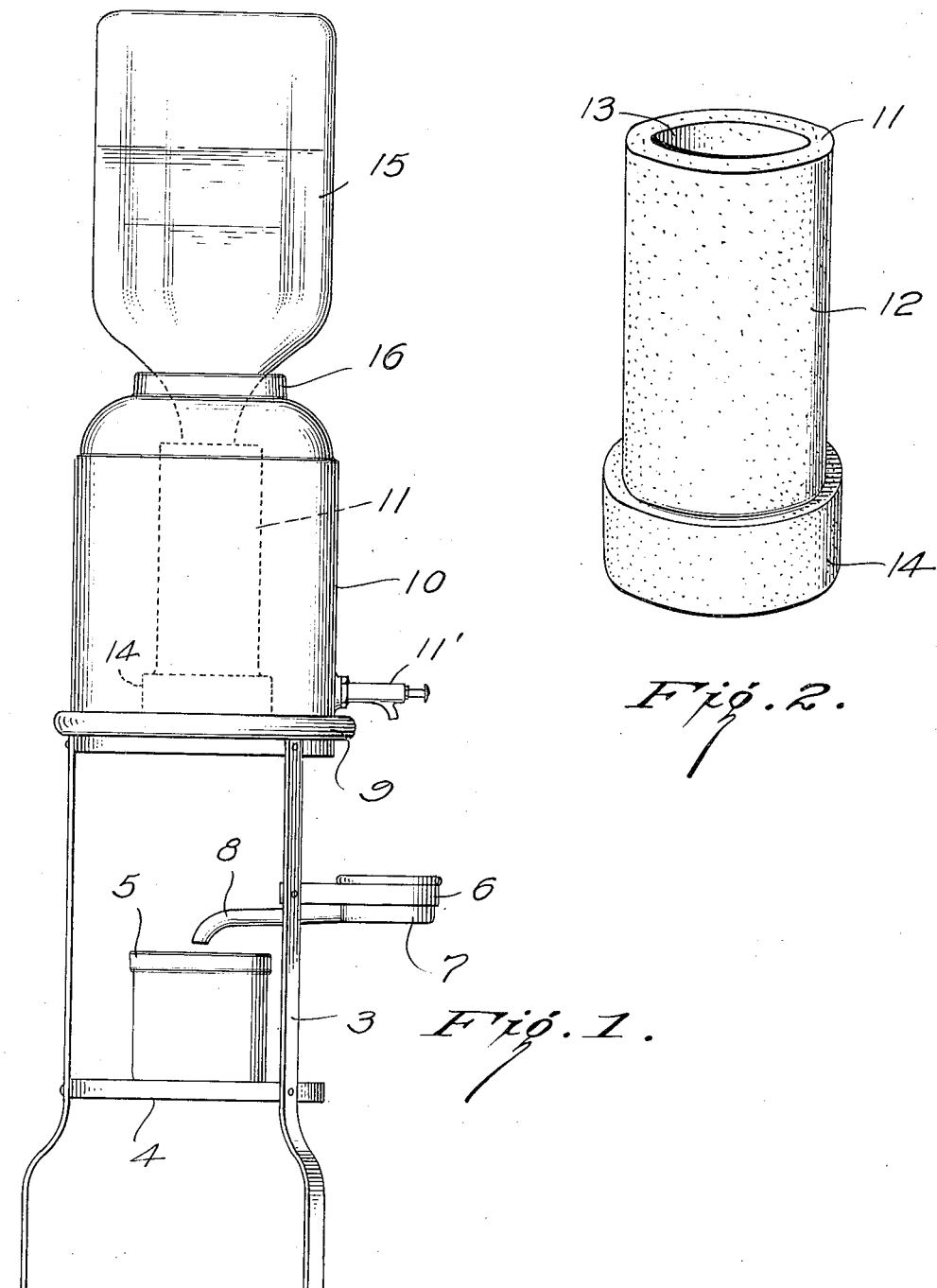
Fig. 1 is an elevation of a water cooler embodying features of the invention and equipped with means for satisfactory removal of fluorine so as to provide a drinking water having a fluorine content not above the toxic level.
Fig. 2 is an enlarged perspective view of the filtering element of the water cooler.

In the drawing, the numeral 3 designates a base or foundation provided with a lower platform 4 for supporting a waste jar 5. By an appropriate bracket 6 the base also supports a drain member 7 communicating with the waste jar 5 by means of the pipe section 8. It is understood that the drainage member 7 has a perforated false bottom or is provided with a center hole communicating with the pipe 8 for permitting excess water to drain into the waste jar 5, in well-known manner. At its top the stand 3 supports a flat base 9 which in turn supports a cooling reservoir or olla 10 which is provided with a tap 11.

Inside of the olla 10, and comprising a feature of the present invention, is a filter element 11. As shown in Fig. 2 this filter element comprises a main cylindrical body portion 12 which is preferably formed of porcelain. This body portion is open at its upper end, as at 13, but is closed at its lower end by means of a collar 14 which holds or secures a section of muslin or other appropriate porous medium over the lower end of the filter element.

The water supply is contained within the jar or bottle 15, generally the well-known five gallon bottle, which is inverted into the olla 10 and supported at its upper end by the reduced portion 16. The height of the filter element 11 is such that the neck of the bottle 15 extends a slight distance into the upper end 13 of the filter element. For the purpose of effectively removing fluorine from a fluorine contaminated water in the contents of the bottle 15, the hollow interior of the filter element 11 is filled with a treatment material of the present invention, this material preferably taking the form of the preferred crushed bone initially pretreated as hereinbefore described. Water flows from the bottle 15 through the bone filling in the filter element by gravity and is defluorinated by so doing. When the water level in the olla reaches the height of the lower end of the bottle neck the pressure is equalized and stops the flow of water until some is withdrawn from the olla. The olla 10 is porous and permits some water to seep through the walls. Upon evaporating it cools the stored water within the olla. Since all of the water contained within the bottle 15 must pass through the filter bed provided within the filter element 11, it is assured ample contact with the active defluorinating agent within the filter element and a properly defluorinated water is delivered from the faucet 11. Knowing that each bottle contains five gallons of water, or whatever is its capacity, it is relatively simple to keep count of the bottles to determine the total amount of water filtered. Therefore, knowing the effect of the material within the filter element 11, it is a relatively simple matter to calculate when this material is exhausted and ineffective in reducing the fluorine content below the toxic level. Upon this condition being reached, the filtering material may be removed and regenerated in accordance with the principles of this invention or a replacement filter element 11 equipped with active defluorinating filtering material may be substituted for the exhausted element.

Thus, where it is impractical to treat entire municipal water supplies or the entire contents of wells, the invention may readily be embodied in a device of the foregoing type and used to supply defluorinated drinking water in homes, schools, offices and the like.

It is also possible to employ the treatment materials of the present invention in pressure type filters similar to the conventional zeolite water softeners. In other words the material may be used in the conventional water softener in place of the zeolite normally used therein. However, this pressure type filter should be used in connection with a meter in order to determine the amount of water passed through and hence the time at which the filter medium becomes exhausted.. Such a pressure filter may be equipped with a meter to be read manually to determine when the filter medium is exhausted but preferably should be provided with an automatic alarm which will indicate precisely when such an amount of water has passed through that the filter medium would be exhausted and incapable of reducing the fluorine content below the toxic level.

Thus the practicability of the use of the bone treatment of the present invention for fluorine removal from water in a faucet filter or cooler filter for home, office and school use, is readily apparent. It is also feasible for use on a large scale for treatment of municipal water supplies. In view of the fact that the fluorine absorbing power of the bone can be repeatedly renewed, it is believed apparent that the treatment described herein is economical and eminently satisfactory in the treatment of entire municipal water supplies.

The present invention employs, among its novel features, a method of initially preparing bone and other apatites and phosphatic compounds for use in the removal of fluorine, the treatment of fluorine bearing water or other liquids with such specially prepared materials and a method of treating spent material for renewing its fluorine absorbing powers.

While the invention has been herein described as applied to the treatment of drinking water supplies, it is apparent that it is equally applicable to the purification of other liquids designed for human consumption. For instance, in the Pacific northwest, apples are sprayed with a fluorine spray. Culls containing fluorine cannot profitably be washed so are pressed for cider without cleaning. Obviously the method described herein can be successfully applied to such fluorine containing cider and will be effective in reducing the fluorine content to a point below the toxic level. Therefore, wherever in the specification and claims the term "water" is used, such term is obviously meant to include any potable liquid ultimately designed for human consumption.

Thus this invention comprises broadly the use of bone and other calcium phosphates for removal of fluorine from water and other potable liquids. It has been shown, as an important feature hereof, that treatment of the bone with an alkali followed by a short acid treatment will materially enhance its fluorine absorbing power, and a similar treatment after exhaustion will reactivate the bone and renew its fluorine absorbing power.

In the initial preparation of the bone calcination has been found desirable because it inhibits any tendency of the bone to putrefy and increases its wetability. In addition, the calcination step makes the bone harder and less subject to losses by attrition and dissolution; the surface area is increased, by the resulting porosity, thus increasing the contact area which results in enhanced capacity for fluorine removal; and more fluorine is removed from the bone which also serves to increase its fluorine removing power. It has been determined that initial processing of the bone by treatment with alkali, washing, neutralizing with acid, calcining for about ten minutes at temperatures from about 400° to 600° C., followed by a short treatment with acid, yields an excellent bone product which is highly efficient in the removal of fluorine from fluorine contaminated liquids.

The pH of the water, the temperature of the reacting mixture, and the presence of other salts in the water seem to have no effect on the fluorine removal process.

While herein there have been discussed several substances containing calcium phosphate or tricalcium phosphate which might be useful in the removal of fluorine from water, the preferred bone, treated as herein described, is more than twice as effective and efficient in the treatment of water for fluorine removal as any other substance now known to us.

What is claimed is:

1. The process of removing fluorine from fluorine contaminated water which comprises, treating crushed bone with a solution of an alkali to remove fluorine therefrom, washing out the alkali and fluorine removed thereby, neutralizing the bone with an acid, and intimately contacting the water to be treated with the thus defluorinated bone.

2. The process of removing fluorine from fluorine contaminated water which comprises, treating crushed bone with a soution of sodium hydroxide to remove fluorine therefrom, washing out the sodium hydroxide and fluorine removed thereby, neutralizing the bone with an acid, and intimately contacting the water to be treated with the thus defluorinated bone.

3. The process of removing fluorine from fluorine contaminated water which comprises, treating crushed bone with a solution of sodium hydroxide to remove fluorine therefrom, washing out the sodium hydroxide and fluorine removed thereby, neutralizing the bone with an acid, calcining the bone, and intimately contacting the water to be treated with the thus treated bone.

4. The process of removing fluorine from fluorine contaminated water which comprises, treating crushed bone with a solution of sodium hydroxide to remove fluorine therefrom, washing out the sodium hydroxide and fluorine removed thereby, neutralizing the bone with an acid, calcining the bone, treating the calcined bone with an acid, and intimately contacting the water to be treated with the thus treated bone.

5. The process of activating bone for use as an agent for the removal of fluorine from fluorine contaminated water which comprises, treating the crushed bone with a solution of an alkali, washing out the alkali, and neutralizing the thus treated bone with an acid.

6. The process of activating bone for use as an agent for the removal of fluorine from fluorine contaminated water which comprises, treating the crushed bone with a solution of an alkali, washing out the alkali, neutralizing the bone with an acid, and calcining the thus treated bone.

7. The process of activating bone for use as an agent for the removal of fluorine from fluorine contaminated water which comprises, treating the crushed bone with a solution of sodium hydroxide, washing out the sodium hydroxide, and neutralizing the thus treated bone with an acid.

8. The process of activating bone for use as an agent for the removal of fluorine from fluorine contaminated water which comprises, treating the crushed bone with a solution of sodium hydroxide, washing out the sodium hydroxide, and neutralizing the thus treated bone with hydrochloric acid.

9. The process of activating bone for use as an agent for the removal of fluorine from fluorine contaminated water which comprises, treating the crushed bone with a solution of sodium hydroxide, washing out the sodium hydroxide, and neutralizing the thus treated bone with acetic acid.

10. The process of activating bone for use as an agent for the removal of fluorine from fluorine contaminated water which comprises, treating the crushed bone with a solution of sodium hydroxide, washing out the sodium hydroxide, and neutralizing the thus treated bone with carbon dioxide.

11. As a new product, an agent for the removal of fluorine from fluorine contaminated water comprising, ground bone substantially freed of fluorine by treatment with a solution of an alkali and subsequent neutralization with an acid.

12. As a new product, an agent for the removal of fluorine from fluorine contaminated water comprising, ground bone which has been treated with a solution of sodium hydroxide, washed, neutralized, and calcined.

HOWARD V. SMITH.
MARGARET C. SMITH.